Dec. 17, 1940. C. H. LARSON Re. 21,661
MERCURY SWITCH
Original Filed June 1, 1936 2 Sheets-Sheet 1
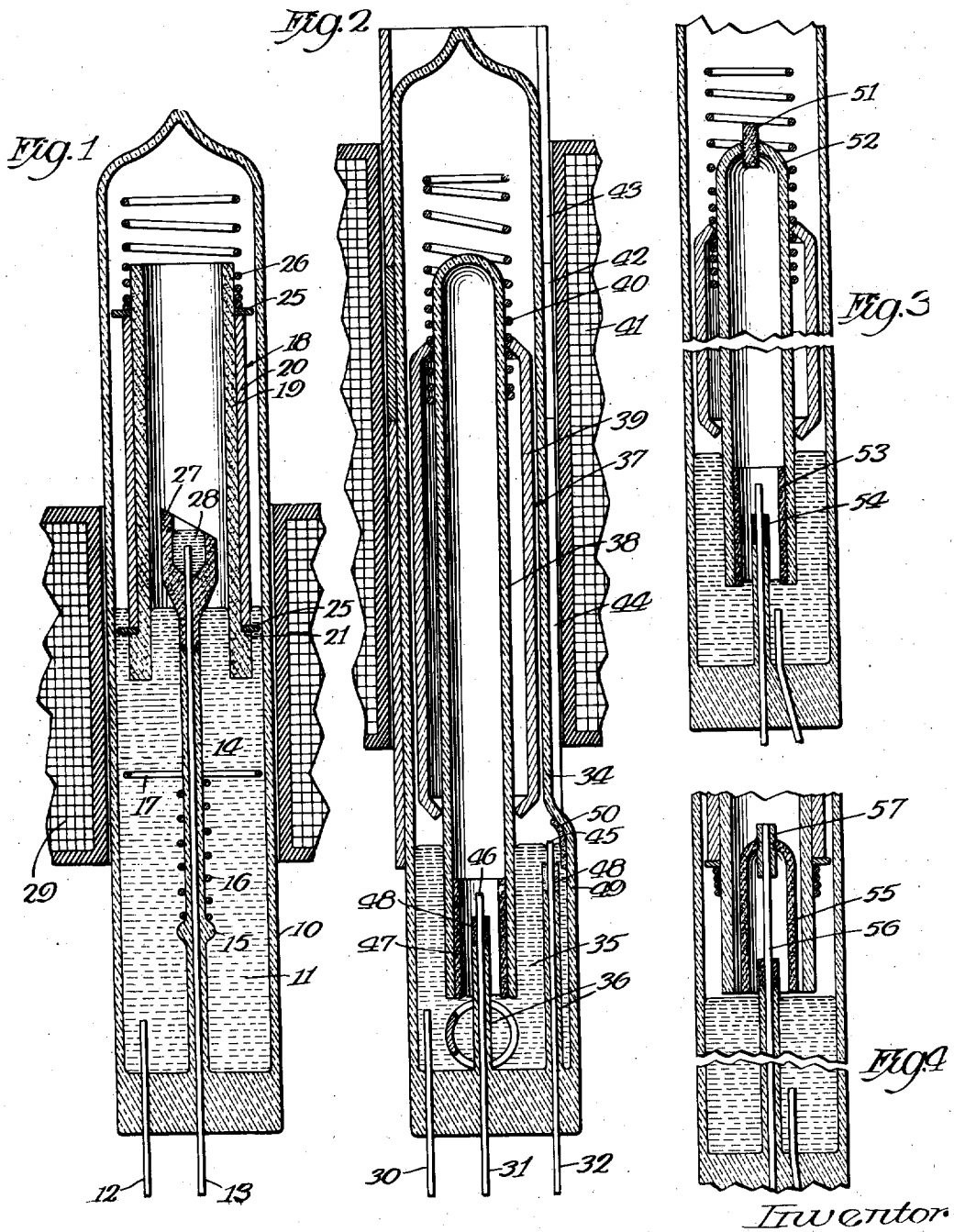
Inventor
Carl H. Larson
By Gilson, Mann & Co
Attys.

MERCURY SWITCH

Original Filed June 1, 1936 2 Sheets-Sheet 2

INVENTOR.
Carl H. Larson
BY Mann, Brown & Cof
ATTORNEYS.

Reissued Dec. 17, 1940

Re. 21,661

UNITED STATES PATENT OFFICE 21,661

MERCURY SWITCH

Carl H. Larson, Elkhart, Ind., assignor to The Adlake Company, a corporation of Illinois Original No. 2,209,984, dated August 6, 1940, Serial No. 82,855, June 1, 1936. Application for reissue September 30, 1940, Serial No. 360,004

18 Claims. (Cl. 200—112)

When a formed ceramic piece is applied to a vitreous part of a mercury switch or similar device, it has been the practice to use cement for making the bond. However, almost all cements contain substances which are undesirable to have in an hermetically sealed envelope and therefore should be avoided if possible.

I have found that certain ceramic material can be fused to certain borosilicate glasses that have been used for the envelopes of mercury switches and similar devices, and that the bond between the glass and the ceramic material, when thus joined, is actually stronger than either of the two materials. In other words, if a piece of glass is fused to ceramic material in the manner taught by this invention, and an effort is made to break the two apart, the break will not come at the junction of the two materials.

The principal object of the invention, therefore, is to show the application of this principle to mercury switches, particularly of the mercury displacement type, as disclosed in Larson Patent #1,967,247, and thereby provide switch structures which have greater capacity to stand up under severe conditions of use over a long period of time.

Further and other objects and advantages will appear from the following description taken in connection with the accompanying drawings, in which—

Fig. 1 is a sectional view of a fast-acting plunger type mercury switch with a mercury to mercury contact, the central electrode consisting of a ceramic cup which is fused to the glass sleeve surrounding the central electrode;

Fig. 2 is a sectional view of a switch which is provided with a ceramic collar fused to the glass thimble which forms a part of the displacer and which also has a formed piece of ceramic material fused to the side wall of the switch envelope adjacent to the side electrode;

Fig. 3 is a sectional view of a time delay mercury switch in which the time delay element of ceramic material is fused to the glass thimble which constitutes a part of the displacer and in which a ceramic sleeve is fused to the sleeve around the central electrode;

Figure 5:
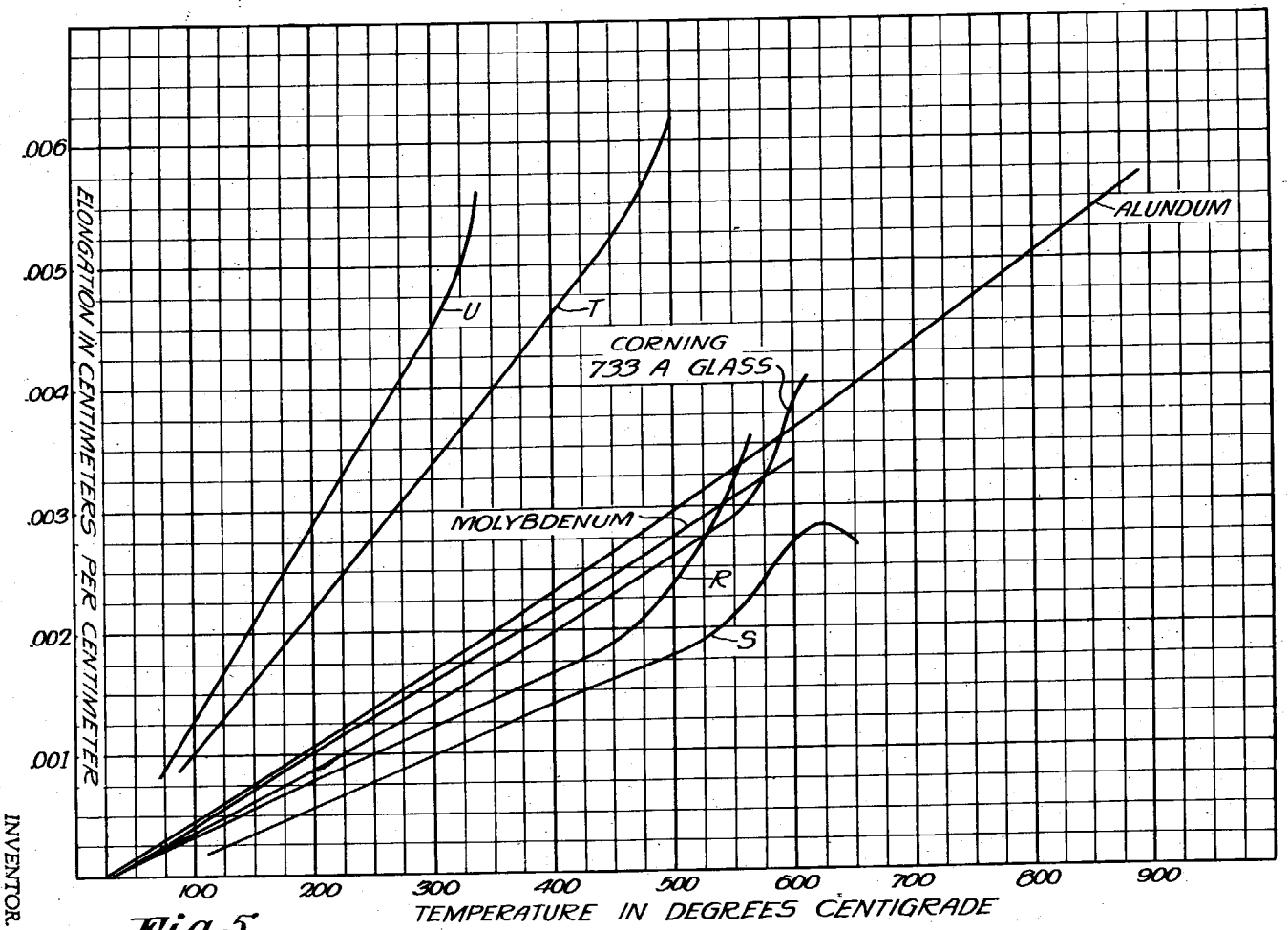

Fig. 4 is a fragmentary, sectional view of a time delay switch in which the ceramic thimble constituting the time delay element is mounted on the central electrode by a small piece of glass tubing fused to the top of the electrode and to the thimble; and Fig. 5 is a graph showing, with some degree of approximation, the expansion curves for certain ceramic and glass materials which are referred to in the specification and claims.

Several preferred embodiments of the invention are shown in the drawings and will hereafter be described, but it will be understood that the selection of these preferred embodiments is merely for the purpose of complying with section 4888 of the Revised Statutes and should not be construed as limiting the appended claims unless required by the prior art.

In all forms of the invention where a part of the switch is described as being made of glass, it will be understood, unless the contrary is specified, that the glass is a borosilicate or other hard glass having a low coefficient of expansion, such, for example, as 733A of the Corning Glass Works, Corning, New York, which I am informed has a percentage composition substantially as follows:

| | |
|---|---|
| $SiO_2$ | 76 |
| $Al_2O_3$ | 4.5 |
| $Na_2O$ | 6 |
| $K_2O$ | 2.5 |
| $B_2O_3$ | 11 |
| | 100.00 |

Also, it will be understood that when a switch part is described as being of ceramic material, porous material, or refractory material, a material such, for example, as Alundum (Grade RA84, RA360 or RA98), a product of the Norton Company, Worcester, Massachusetts, is meant. Alundum, I am informed, is substantially pure $Al_2O_3$. Glass of the type disclosed in Warnke Patent #1,996,845, issued April 9, 1935, will also fuse satisfactorily with Alundum.

It is a well known fact that for glass to seal with molybdenum, it must have a linear coefficient of expansion at room temperature not greater than $5.4 \times 10^{-6}$. Corning glass 733A has a coefficient of expansion of approximately $5.0 \times 10^{-6}$ at room temperature, which is sufficiently close to that of molybdenum to form a good seal. Alundum has substantially the same coefficient of expansion. Obviously, if Warnke glass is to be used with molybdenum, the percentages for the ingredients must be chosen within the disclosure of that patent so that the glass will have a linear coefficient of expansion at room temperature close to that of molybdenum, in all events not greater than $5.4 \times 10^{-6}$.

It is not definitely known why these particular glasses and ceramic materials will form a satisfactory seal, but it is believed that there are two factors which contribute to the formation of the stable bond: First, there is reason to believe that the ceramic material is of such composition and granular structure that it actually blends with the glass and forms an intermediate grade of glass with the ceramic and the glass being sealed to it. Secondly, and possibly of greatest importance, is the fact that Alundum, in addition to having substantially the same coefficient of expansion as 733A glass at room temperature, also has an expansion curve that is remarkably close to and almost coincident with the expansion curve for the glass even up to its annealing temperature. This similarity in the shape and steepness of the expansion curves, taken in conjunction with the intermediate glass that is formed between the ceramic and glass sleeve, probably accounts for the highly successful seal that can be formed by following the teachings of this invention.

Warnke glass has an expansion curve which, if not exactly coincident with the expansion curve for Alundum, is at least substantially parallel to and sufficiently close to effect a satisfactory fused seal between the materials over wide ranges of temperature changes.

The expansion curve for molybdenum is also sufficiently close to and substantially parallel with the corresponding curves for the glass and ceramic materials specified above that no difficulty is encountered in sealing the glass to molybdenum to form a stable bond.

These various relationships are clearly shown in Fig. 5, in which the curves shown are approximations of the expansion curves for the materials indicated. It will be seen that the expansion curves for Alundum and 733A glass are never apart by more than 375 millionths per centimeter, even up to the fusion point of the glass, which is approximately 600° centigrade. The glass indicated by the curve R will also fuse satisfactorily with Alundum, even though at 425° centigrade the two curves are apart by approximately 750 millionths per centimeter. The fact that curve A crosses the Alundum curve is of no consequence because the upturn in the curve merely brings the curves closer together and they do not move apart more than a tolerable amount until fusion temperature is reached. Curves S, T and U represent the expansion curves of other glasses which will not fuse satisfactorily with Alundum due to the fact that the expansion curves of these glasses are not sufficiently close to or parallel with the Alundum curve to form a satisfactory seal. Although the glass represented by curve S might form a satisfactory seal with Alundum at room temperature due to the proximity of the expansion curves at that temperature, the rates of expansion differ too greatly at the higher temperatures to result in a satisfactory bond.

In the form of the invention shown in Fig. 1, the switch envelope 10 is made of glass and contains a quantity of mercury 11. A pair of electrodes 12 and 13 are sealed through the bottom of the envelope, the latter electrode being enclosed within a glass sleeve 14 for a portion of its height. The sleeve 14 has a bulge 15 which acts as a seat for a spring 16, the upper end of which is spread out, as indicated at 17, to yieldingly restrain the displacer, generally designated 18, from striking the bottom of the switch envelope.

The displacer 18 comprises an inner sleeve 19 of glass, ceramic or other light weight, nonmagnetic material, and an outer sleeve 20 of magnetic material. The inner sleeve 19 has its lower end enlarged to form a shoulder 21 on which the outer sleeve 20 is mounted. Guide washers 25 are carried by the displacer for guiding its movement within the switch envelope, the top washer being held in place by coil spring 26.

A ceramic cup 27 is mounted on the projecting end of the electrode 13 and contains a pool of mercury 28 which is in contact with the end of the electrode 13. In practice, the cup is secured in place before the electrodes 12 and 13 are pinch-sealed into the envelope. After the glass sleeve 14 has been heat bonded to the electrode, preferably made of molybdenum, and the spring 16 has been telescoped over the sleeve 14 so as to rest upon the bead 15 formed on the sleeve, the ceramic cup 27, which is drilled to receive the end of the electrode 13, is slipped into place and heat is supplied to the juncture between the two materials. Sufficient heat is applied to cause the glass to flow into the interstices of the ceramic material and the result is a bond which is exceptionally strong.

A coil 29 is associated with the switch and when it is energized the displacer 18 is drawn downwardly, causing the mercury level to rise above the lower edge of the cup 27 and make contact with the mercury pool 28, thus closing the circuit between the electrodes 12 and 13 through the body of mercury 11. When the coil is deenergized, the displacer rises and the mercury level falls, thus breaking the circuit.

The ceramic material of which the cup 27 is formed is sufficiently refractory to withstand the deteriorating effects of the electric arc formed on high inductive loads, and preferably the inner sleeve 19 of the displacer 18 also has good refractory properties. The ceramic material has infinitely superior refractory properties to the glass sleeve to which the ceramic material is fused. When the ceramic material is Alundum, it is furthermore characterized by its hardness, by having good dielectric properties, by having the fusing temperature substantially above 1600° F., by being nonpowdering, and by having an unglazed or roughened surface. This latter property of the ceramic material is extremely important where the ceramic is being used as a part of the electrode structure, because it has been found that a glazed ceramic has a tendency to silver or form a conductive path along its surface resulting in substantially lowering the dielectric constant for the switch and many times resulting in switch failure.

It should be noted that in Fig. 1 the fused bond between the ceramic cup 27 and the glass sleeve 14 is below the lowest level to which the mercury fill falls during the operation of the switch. This means that the joint is kept relatively cool by the surrounding body of mercury, and it also emphasizes the importance of having a bond which is entirely impervious to mercury. When cements are used at this joint in place of a fused bond, a slight breaking down of the cement will greatly reduce the ability of the switch to stand up under a high voltage across the electrodes when the switch is in open position. In other words, the fused joint greatly increases the dielectric constant for the switch.

Certain types of ceramic material give off a powder which is readily discernible when used in a mercury switch. This powder contaminates the mercury and interferes with its free movement to and from contact closing position. It also increases the contact resistance of the switch. It is for this reason that a ceramic material that is non-powdering is preferred for use in accordance with the teachings of this invention.

In Fig. 2 another type of mercury switch is shown, this one being ordinarily called a combination front and back contact switch. In this switch three electrodes 30, 31 and 32 are sealed through the base of a switch envelope 34, which contains a quantity of mercury 35, the electrode 30 always being in contact with the mercury, and the electrodes 31 and 32, each of which is insulated from the mercury fill by a glass sleeve 36 for a portion of its height, being adapted to be intermittently but never simultaneously in contact with the mercury.

A displacer, generally designated 37, which comprises a glass thimble 38, to the upper part of which an iron sleeve 39 is secured by a spring 40 tightly telescoped over the top of the thimble, moves in response to a coil 41 to determine the condition of the electrical circuit between the electrodes. When the coil is energized the displacer moves upwardly in its effort to close the air gap 42 between pole pieces 43 and 44, and in so doing the mercury level recedes sufficiently to uncover the bare end 45 of the electrode 32 and at the same time the displacer, by being lifted above the bare end 46 of the electrode 31, permits mercury to come into contact with the latter electrode.

Upon deenergizing the coil 41 the reverse operation takes place; that is, the thimble 38 caps the central electrode 31 and forces mercury away from the bare end 46 of that electrode, and at the same time displaces sufficient mercury to cover the bare end 45 of the electrode 32. The parts of the switch are so proportioned that at no time is it possible for the mercury to make contact simultaneously with both the electrodes 31 and 32.

When the switch is to be used for heavy duty service, it is necessary to provide some protection for the parts of the switch made of glass, for otherwise the arc formed during the making and breaking of the circuit will have a pronounced tendency to disintegrate or devitrify the glass.

Accordingly formed pieces of ceramic material are fused to the glass at strategic places; i. e., a ceramic collar 47 is fused within the lower portion of the thimble 38 at the place where the making and breaking of the circuit through the electrode 31 takes place. Likewise, the glass sleeves 36 of the electrodes 31 and 32 are topped with short sections of ceramic material, such as indicated at 48, and these sections are fused to the sleeves 36 in the same manner that the cup 27 of the switch in Fig. 1 is fused to the sleeve 14.

In order to keep the over-all dimensions of the switch to a minimum, the electrode 32 is positioned within an elongated protuberance 49 in the lower side wall of the switch envelope and the portion of the protuberance which is immediately adjacent to the bare end 45 of the electrode 32 may be protected from the electric arc by fusing a formed piece of ceramic 50 to the envelope, as shown in Fig. 2.

In Fig. 3 a switch is shown which is somewhat similar to that shown in Fig. 2, except that the switch has only two electrodes and a time delay element is incorporated in the switch for delaying the movement of mercury to and/or away from the central electrode. The principle upon which the switch operates is fully disclosed in Larson Patent #1,967,942, issued July 24, 1934, and hence there is no need for describing the switch in detail.

The time delay element of the switch shown in Fig. 3 consists of a porous plug 51 of ceramic material, the plug being fused into an opening provided in the top of the glass thimble 52. This method of attaching the ceramic time delay element to the displacer is much superior to that disclosed in Larson Patent #1,967,947, issued July 24, 1934, not only because it increases the life of the switch due to the elimination of cementitious substances, but also because it is easier to manufacture a switch in which the ceramic material is fused into place.

Preferably the switch is also provided with a collar 53 and sleeve 54 of ceramic material, both parts being similar in all respects with the collar 47 and sleeve 48 shown in the switch of Fig. 2.

The switch shown in Fig. 4 is of the type disclosed in Larson Patent #1,967,946, issued July 24, 1934, but instead of securing the ceramic thimble 55 to the central electrode 56 by cement, as disclosed in Larson Patent #1,967,946, a small section 57 of glass is fused to the end of the electrode 56, and to this section of glass the cup 55 is fused.

The above specific disclosures are but a few of the ways in which ceramic material may be fused with glass for the purpose of protecting some part of a switch from the ravages of the electric arc or to mount a time delay element in place.

It will be understood that suitable iron circuits are associated with the switches for positioning the air gap with respect to the armature. An iron circuit such as shown in Larson Patent #1,967,951, issued July 24, 1934, is preferred.

When ceramic material is fused to glass, as disclosed herein, the bond between the two materials is absolutely impervious so there is no chance for mercury to make contact with the electrode material.

In practice, the fusion of the glass with the ceramic material is accomplished by heating the two parts to be fused together to a temperature which will cause the glass to flow and bond itself with the ceramic material, and the joint is then slowly cooled to room temperature.

Throughout the specification and claims all values for coefficients of expansion refer to those which obtain for room temperatures; also, the word "parallel" as it is used in describing the relationship between two expansion curves is not to be construed in its strict sense, but rather in the sense that the curves at no temperature within the range of interest move apart more than some given amount, or, in other words, the curves are closely parallel. Obviously the curves may even cross one another and still be parallel in the sense in which the term "parallel" is used herein.

Although certain specific examples have been cited in the specification for glass and ceramic materials that will satisfactorily fuse together, it will be understood that the invention is not limited to these specific materials and that other materials which have parallel expansion curves, in the sense in which that term is here employed, and which have the characteristics and qualities called for in the claims, are included within the scope of this invention.

I claim as my invention:

1. In a mercury switch, the combination of a switch envelope, a mercury fill, spaced electrodes in the envelope one of which is adapted to be intermittently placed in electrical contact with the main body of the mercury fill, a glass sleeve surrounding at least a portion of said one electrode, and a ceramic sleeve fused to the glass sleeve, the glass being a low expansion borosilicate, and the ceramic being a preformed body characterized by having refractory properties that are superior to those of the glass to which it is fused.

2. In a mercury switch, the combination of a switch envelope, a mercury fill, spaced electrodes in the envelope one of which is adapted to be intermittently placed in electrical contact with the main body of the mercury fill, a glass sleeve surrounding at least a portion of said one electrode, and a ceramic sleeve fused to the glass sleeve, the glass being a low expansion borosilicate, and the ceramic being a preformed body characterized by having refractory properties that are superior to those of the glass to which it is fused, said ceramic and glass sleeves having linear expansion curves which are substantially coincident with or closely parallel to one another over a wide range of temperature change.

3. The combination of a switch envelope, a mercury fill, spaced electrodes in the envelope, one of which is adapted to be intermittently placed in electrical contact with the main body of mercury fill, said electrodes being positioned relatively close to a part of the switch which has relatively poor refractory properties so that it is subject to the deteriorating effects of the arc formed at said electrode, and means protecting said part of the switch from the arc comprising a preformed refractory ceramic member fused to a contiguous glass member, said glass being a low expansion borosilicate, and the ceramic having refractory properties that are superior to those of the glass to which it is fused.

4. In a mercury switch, the combination of a switch envelope, a mercury fill, spaced electrodes in the envelope one of which is adapted to be intermittently placed in electrical contact with the main body of the mercury fill, a glass member associated with said one electrode, and a ceramic member fused to the glass member, the glass being a low expansion borosilicate, and the ceramic being a preformed body characterized by having refractory properties that are superior to those of the glass to which it is fused, said ceramic and glass members having linear expansion curves which are substantially coincident with or closely parallel to one another over a wide range of temperature change, and said ceramic member serving as a cup for supporting a body of mercury in constant contact with said one electrode.

5. The combination of a switch envelope, a mercury fill, spaced electrodes in the envelope, one of which is adapted to be intermittently placed in electrical contact with the main body of mercury fill, said electrodes being positioned relatively close to a glass part of the switch which has relatively poor refractory properties so that it is subject to the deteriorating effects of the arc formed at said electrode, and means protecting said part of the switch from the arc comprising a preformed refractory ceramic member fused to said glass part, the glass being a low expansion borosilicate and the ceramic having refractory properties that are superior to those of the glass part.

6. In a mercury switch, the combination of a switch envelope, a mercury fill, a gas fill, spaced electrodes in the envelope one of which is adapted to be intermittently placed in electrical contact with the main body of the mercury fill, a thimble telescoped over said one electrode and provided with a gas pervious wall for permitting gas to pass at a controlled rate between the inside and outside of the thimble, a part of the thimble being of glass and a part being of ceramic material, the glass being a low expansion borosilicate and the ceramic being fused to the glass and being a preformed body characterized by having refractory properties that are superior to the glass.

7. In a mercury switch, the combination of a switch envelope, a mercury fill, spaced electrodes in the envelope one of which is adapted to be intermittently placed in electrical contact with the main body of the mercury fill, a glass sleeve surrounding at least a portion of said one electrode and heat bonded to it, and a ceramic sleeve fused to the glass sleeve, the glass being a low expansion borosilicate, and the ceramic being a pre-formed body characterized by having refractory properties that are superior to those of the glass to which it is fused, the ceramic and glass sleeves having linear expansion curves which are substantially coincident with or closely parallel to one another and to the corresponding curve for the material of which said one electrode is formed, over a wide range of temperature change.

8. In a mercury switch, the combination of a switch envelope, a mercury fill, spaced electrodes in the envelope one of which is adapted to be intermittently placed in electrical contact with the main body of the mercury fill, a glass sleeve surrounding at least a portion of said one electrode and heat bonded to it, and a ceramic sleeve fused to the glass sleeve, the glass being a low expansion borosilicate and the ceramic being a pre-formed body characterized by having refractory properties that are superior to those of the glass to which it is fused, the ceramic and glass sleeves having linear expansion curves which are substantially coincident with or closely parallel to one another and to the corresponding curve for the material of which said one electrode is formed, over a wide range of temperature change, all of said curves having linear coefficient of expansion values at room temperature which are less than $5.4 \times 10^{-6}$.

9. In a mercury switch, the combination of a switch envelope, a mercury fill, spaced electrodes in the envelope one of which is adapted to be intermittently placed in electrical contact with the main body of the mercury fill, a glass sleeve surrounding at least a portion of said one electrode, and a ceramic sleeve fused to the glass sleeve, the glass being a low expansion borosilicate having approximately the following percentage composition:

| | |
|---|---|
| $SiO_2$ | 76 |
| $Al_2O_3$ | 4.5 |
| $Na_2O$ | 6 |
| $K_2O$ | 2.5 |
| $B_2O_3$ | 11 |
| | 100. |

and the ceramic being a pre-formed body characterized by having refractory properties that are superior to those of the glass to which it is fused and by being composed mainly of aluminum oxide.

10. In a circuit breaker of the mercury contact type, the combination of a switch envelope, a mercury fill, spaced electrodes in the envelope, one of which is made of molybdenum and projects upwardly through the mercury fill, said one electrode being covered for a portion of its length with an insulating sleeve leaving an exposed end adapted to be intermittently placed in contact with the main body of mercury as it rises and falls with respect to the exposed end, said insulating sleeve being formed in two parts, the lower one of which is made of a borosilicate glass having a coefficient of expansion that enables it to be heat bonded to the electrode which it encloses, and the upper part being made of a hard preformed ceramic material having refractory properties that are superior to those of the glass supporting the ceramic and having an expansion curve that is substantially parallel to the expansion curve of the glass.

11. In a mercury switch, the combination of a switch envelope, a mercury fill, spaced electrodes in the envelope one of which is adapted to be intermittently placed in electrical contact with the main body of the mercury fill, a glass member associated with said one electrode, a ceramic member fused to the glass member, the glass being a low expansion borosilicate and the ceramic being a pre-formed body characterized by having refractory properties that are superior to those of the glass to which it is fused and by having an unglazed outer surface, said ceramic and glass members having linear expansion curves which are substantially coincident with or closely parallel to one another over a wide range of temperature change, and said ceramic member serving as a cup for supporting a body of mercury in constant contact with said one electrode.

12. In a circuit breaker of the mercury contact type, the combination of a switch envelope, a mercury fill, spaced electrodes in the envelope, one of which projects upwardly through the mercury fill and is covered for a portion of its length with an insulating sleeve leaving an exposed end adapted to be intermittently placed in contact with the main body of mercury as the mercury fill rises and falls along the insulating sleeve, said insulating sleeve comprising a lower glass portion to which an upper ceramic portion is fused, the glass being a low expansion borosilicate and the ceramic being a pre-formed body characterized by its hardness, roughened surface, and refractory properties which are superior to those of the glass.

13. In a circuit breaker of the mercury contact type, the combination of a switch envelope, a mercury fill, spaced electrodes in the envelope, means for shifting the mercury fill from a low level to a high level to change the condition of the electrical circuit through the electrodes, one of said electrodes projecting upwardly through the mercury fill and being surrounded for at least a portion of its length with an insulating sleeve leaving an exposed end adapted to be intermittently placed in contact with the main body of mercury as the mercury fill rises and falls along the insulating sleeve in response to the mercury shifting means, said insulating sleeve comprising a lower glass portion to which an upper ceramic portion is fused, the ceramic being a pre-formed body characterized by having refractory properties that are superior to the glass to which it is fused and the fused joint between the glass and the ceramic being below the low level of the mercury whereby the glass is protected from the heat of the arc by the surrounding body of mercury, the glass having properties permitting it to be fused directly with the ceramic.

14. In a circuit breaker of the mercury contact type, the combination of a switch envelope, a mercury fill, spaced electrodes in the envelope, means for shifting the mercury fill from a low level to a high level to change the condition of the electrical circuit through the electrodes, one of said electrodes projecting upwardly through the mercury fill and being surrounded for at least a portion of its length with an insulating sleeve leaving an exposed end adapted to be intermittently placed in contact with the main body of mercury as the mercury fill rises and falls along the insulating sleeve in response to the mercury shifting means, said insulating sleeve comprising a lower glass portion to which an upper ceramic portion is fused, the ceramic being a pre-formed body serving as a cup for supporting a body of mercury in constant contact with said one electrode and having relatively straight vertical side walls formed of a ceramic material that is characterized by having refractory properties superior to those of the glass to which it is fused, by having an unglazed outer surface, and the fused joint between the glass and the ceramic being below the low level of mercury whereby the glass is protected from the heat of the arc by the surrounding body of mercury.

15. In a mercury switch, the combination of a switch envelope, a mercury fill, spaced electrodes in the envelope, one of which is adapted to be intermittently placed in electrical contact with the main body of the mercury fill, a glass sleeve surrounding at least a portion of said one electrode, and a ceramic sleeve fused to the glass sleeve, the glass being a borosilicate having a coefficient of expansion of $5.4 \times 10^{-6}$ or less and the ceramic being a pre-formed body characterized by having refractory properties that are superior to those of the glass to which it is fused.

16. In a circuit breaker of the mercury contact type, the combination of a switch envelope, a mercury fill, spaced electrodes in the envelope one of which projects upwardly through the mercury fill, said one electrode being covered for a portion of its length with an insulating sleeve leaving an exposed end adapted to be intermittently placed in contact with the main body of mercury as it rises and falls with respect to the exposed end, said insulating sleeve being formed in two parts, the lower one of which is made of a borosilicate glass having a coefficient of expansion that enables it to be heat bonded to the electrode which it encloses and the upper part being made of a hard pre-formed ceramic material having refractory properties which are superior to those of the glass to which it is fused and having an expansion curve which, over a wide range of temperatures, is relatively close to the corresponding curve for the glass.

17. In a circuit breaker of the mercury contact type, the combination of a switch envelope, a mercury fill, spaced electrodes in the envelope one of which is molybdenum and projects upwardly through the mercury fill, said one electrode being covered for a portion of its length with an insulating sleeve leaving an exposed end adapted to be intermittently placed in contact with the main body of mercury as it rises and falls with respect to the exposed end, said insulating sleeve being formed in two parts, the lower one of which is made of a borosilicate glass having a coefficient of expansion that enables it to be heat bonded to the electrode which it encloses and the upper part being made of a hard pre-formed ceramic material having refractory properties which are superior to those of the glass to which it is fused and having an expansion curve which, over a wide range of temperatures, is relatively close to the corresponding curve for the glass, the coefficient of linear expansion for the ceramic and glass at room temperature each being not more than $5.4 \times 10^{-6}$.

18. In a circuit breaker of the mercury contact type, the combination of a switch envelope, a mercury fill, spaced electrodes in the envelope, means for shifting the mercury fill from a low level to a high level to change the condition of the electrical circuit through the electrodes, one of said electrodes projecting upwardly through the mercury fill and being covered for a portion of its length with an insulating sleeve leaving an exposed end adapted to be intermittently placed in contact with the main body of mercury as the mercury fill rises and falls along the insulating sleeve in response to the mercury shifting means, said insulating sleeve comprising a lower glass portion to which an upper ceramic portion is fused, the ceramic being a pre-formed body characterized by being substantially non-powdering and by having refractory properties that are superior to the glass to which it is fused, and the fused joint between the glass and the ceramic being below the low level of the mercury whereby the glass is protected from the heat of the arc by the surrounding body of mercury.

CARL H. LARSON.